(12) United States Patent
Shieh (10) Patent No.: US 11,743,263 B2
(45) Date of Patent: Aug. 29, 2023

(54) SYSTEM AND METHOD TO CONTROL APPLICATION ACCESS

(71) Applicant: Appaegis Inc., Sunnyvale, CA (US)

(72) Inventor: Choung-Yaw Michael Shieh, Palo Alto, CA (US)

(73) Assignee: Appaegis Inc., Palo Alto, CA (US)

( * ) Notice: Subject to any disclaimer, the term of this patent is extended or adjusted under 35 U.S.C. 154(b) by 415 days.

(21) Appl. No.: 17/094,980

(22) Filed: Nov. 11, 2020

(65) Prior Publication Data

US 2022/0150254 A1    May 12, 2022

(51) Int. Cl.
*H04L 9/40*        (2022.01)
*H04L 67/55*       (2022.01)

(52) U.S. Cl.
CPC ........ *H04L 63/101* (2013.01); *H04L 63/0884* (2013.01); *H04L 63/0892* (2013.01); *H04L 63/105* (2013.01); *H04L 63/107* (2013.01); *H04L 67/55* (2022.05)

(58) Field of Classification Search
CPC ............... H04L 63/101; H04L 63/0884; H04L 63/0892; H04L 63/105; H04L 63/107; H04L 67/55; H04L 63/1425; H04L 67/02; H04L 67/562; H04L 63/102
See application file for complete search history.

(56) References Cited

U.S. PATENT DOCUMENTS

| | | |
|---|---|---|
| 9,391,832 B1 | 7/2016 | Song et al. |
| 2014/0129920 A1* | 5/2014 | Sheretov ................. H04L 63/20 715/234 |
| 2017/0257385 A1* | 9/2017 | Overson ............. H04L 63/1416 |
| 2020/0145385 A1* | 5/2020 | Chauhan ............... H04L 67/568 |
| 2020/0412830 A1* | 12/2020 | Gallardo ................ H04L 67/63 |

FOREIGN PATENT DOCUMENTS

EP    2847686 A1    10/2019

* cited by examiner

*Primary Examiner* — Amie C. Lin
(74) *Attorney, Agent, or Firm* — Jason C. Cameron (57) ABSTRACT

A system to control application access is disclosed. The system facilitates user interaction with a target application from a local browser in an additional secure approach. Here, an intermediate browser is communicatively coupled with the client browser to enable access of a user to the target application based on predefined levels of authorization. The system provides a way to define control profiles to control the application interaction based on administrator's needs. The user may access only a specific control profile of the target application.

18 Claims, 6 Drawing Sheets

SYSTEM AND METHOD TO CONTROL APPLICATION ACCESS

FIELD OF INVENTION

Embodiments of a present disclosure relates to a field of application security, and more particularly to a system and a method to control application access via an intermediate browser.

BACKGROUND

Enterprises (e.g., corporations, partnerships, academic institutions, and other organizations) usually maintain enterprise computer networks that allow enterprise users, such as employees, to access enterprise applications, data, and other enterprise resources. Enterprise applications include hardware and software applications for email, customer relationship management (CRM), enterprise resource planning (ERP), documents, document management services, enterprise application stores, and the like. Hence, enterprise applications are the critical assets of any enterprise or organization.

Other than employees, there are contractors, temporary workers, and partners who access these enterprise applications with personal devices. Here, access via personal devices will always lead to security problem for data associated with the enterprise applications. With rising data leakage concerns, enterprise administrators need to increase their control on how users access the enterprise applications.

Current trends of BYOD (Bring Your Own Device) to use personal device in enterprise office environment further introduce additional unmanaged devices to access the enterprise applications. These devices are not controlled by the enterprise. There may be unpatched vulnerability or outdated software running on these devices. It creates challenges to secure and control the application access.

Conventionally, the enterprise applications lack any effective system to secure and control the application access of any user with certain pre-defined level of authorization. The enterprise administrators are unable to control what data the user could see or decide if the user could print or download that data.

Hence, there is a need for an improved system to control application access and a method to operate the same and therefore address the aforementioned issues.

BRIEF DESCRIPTION

In accordance with one embodiment of the disclosure, a system to control application access is disclosed. The system includes a control profile generation subsystem operable by one or more processors. The control profile generation subsystem is configured to identify one or more controllable objects associated with one or more webpages of a target application. The control profile generation subsystem is also configured to create one or more webpage control profiles for the one or more webpages based on one or more inputs received from an administrator for identified one or more controllable objects with respect to one or more users with predefined levels of authorization. The control profile generation subsystem is configured to aggregate the one or more webpage control profiles of all webpages pages to generate a control profile of the target application.

The system also includes an intermediate browser communicatively coupled with a local browser. The intermediate browser is configured to act as client of application connections to the target application based on input received from the one or more users via the local browser. The intermediate browser is also configured to enable access of the one or more users to the target application based on the predefined levels of authorization of the one or more users with respect to the control profile of the target application. The intermediate browser is also configured to send the render output of the intermediate browser to the local browser in form of one or more presentable attributes.

In accordance with one embodiment of the disclosure, a method to control application access is disclosed. The method includes receiving input for accessing a target application from one or more user via a local browser. The method also includes enabling access of the one or more users to the target application based on a predefined level of authorization of the one or more users with respect to a control profile of the target application. The method also includes loading the control profile for the target application.

The method also includes rendering output of the intermediate browser in form of one or more presentable attributes. The method also includes sending rendered output of the intermediate browser to the local browser for display.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "subsystem" that is configured and operated to perform certain operations. The "subsystem" may be implemented mechanically or electronically, so a subsystem may comprise dedicated circuitry or logic that is permanently configured (within a special-purpose processor) to perform certain operations. The "subsystem" may also comprise programmable logic or circuitry (as encompassed within a general-purpose processor or other programmable processor) that is temporarily configured by software to perform certain operations. Accordingly, the term "subsystem" should be understood to encompass a tangible entity, be that an entity that is physically constructed permanently configured (hardwired) or temporarily configured (programmed) to operate in a certain manner and/or to perform certain operations described herein.

Embodiments of the present disclosure relates to a system to control application access of users to enterprise applications from any device. The system facilitates user's interaction with a target application from a local browser installed in the user's device without installing any access management software in a secure manner. An intermediate browser is communicatively coupled with the client browser. The user interacts with the target application via the intermediate browser. The intermediate browser enables access of the user to the target application based on a predefined level of authorization assigned to the user, as a result of that the user may access only allowed features of the target applications. The intermediate browser is also configured to send rendering output of the target application in form of one or more presentable attributes to the local browser which is in turn displayed to the user.

Figure 1:
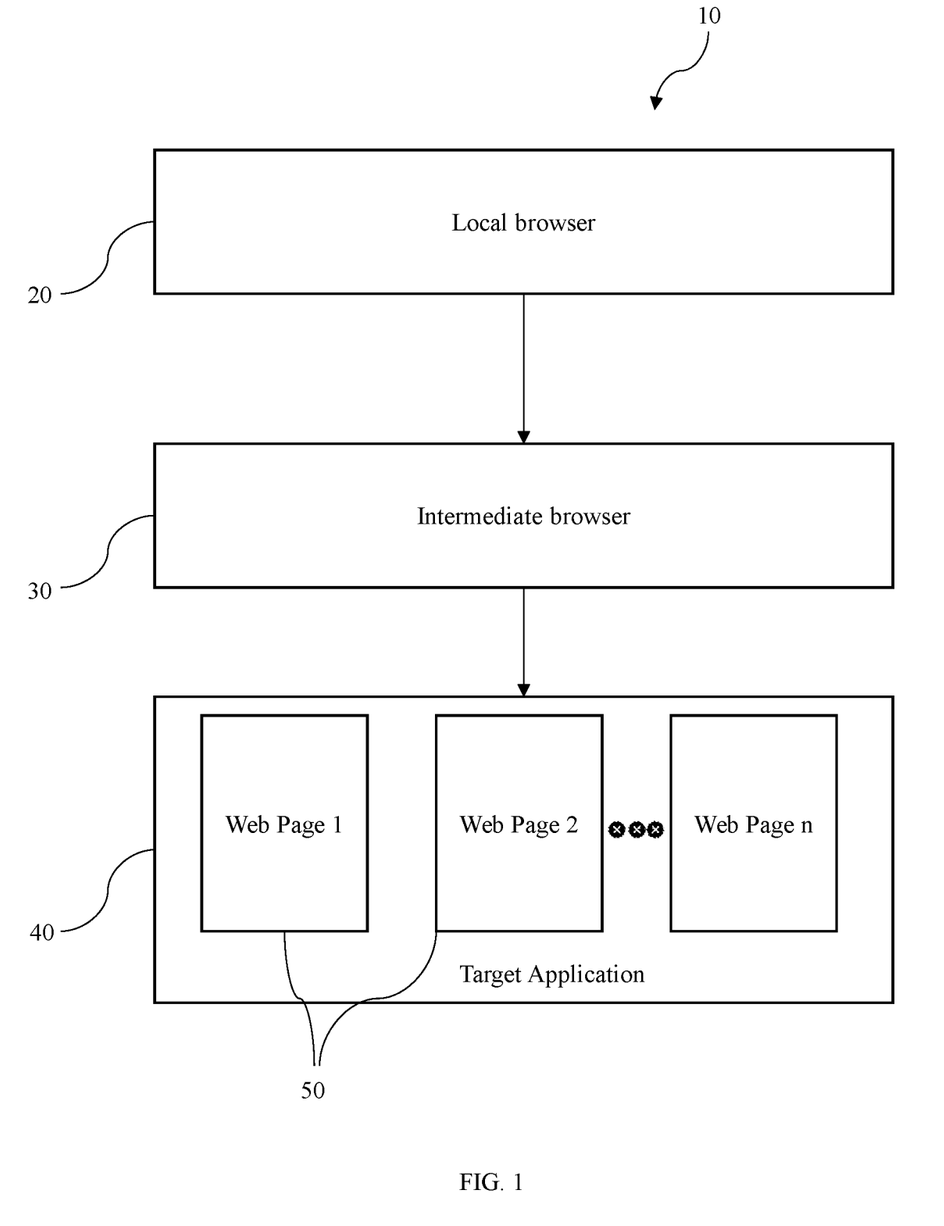
FIG. 1 is a block diagram representation of an application access system with an intermediate browser in accordance with an embodiment of the present disclosure.

FIG. 1 is a block diagram representation of an application access system 10 with an intermediate browser in accordance with an embodiment of the present disclosure. The application access system 10 provides secure connection linkage between a local browser 20 and a target application 40 via the intermediate browser 30. Such secure connection facilitates unprecedent levels of controls over what any user may access on the target application web pages 50. Additionally, the secure connection prevents any potential attacks through established user devices.

With reference to FIG. 1, any user may initiate access to the target application 40 via the intermediate browser 30. In such embodiment, the user through the local browser 20 accesses the target application multiple web pages 50. Here, the intermediate browser 30 enables the user to interact with one or more presentable attributes of the target application 40. In such an embodiment, the one or more presentable attributes include pixelated images, graphic vector, ASCII characters, transformed HTML contents or any combination thereof.

Such stated attributes prevent any zero-day attacks from the local browser 20 or device. A zero-day vulnerability may be understood in present context as a unknown software security flaw, or it is known to the software vendor but doesn't have a patch in place to fix the flaw. It has the potential to be exploited by cybercriminals. The intermediate browser 30 connects to target application 40 through protocols such as HTTP, HTTPS, and the like. In such embodiment, the target application 40 may be any SaaS (Software as a Service) such as Office 365®, Google® G-suite, Salesforce®, and the like.

It is pertinent to note that the application access system 10 controls the behaviour of the web pages 50 corresponding to the targeted application 40 via the intermediate browser 30. In such embodiment, the controls may be disabling a hyperlink, greying out any button, hiding some objects of the web pages 50, and the like.

Figure 3:
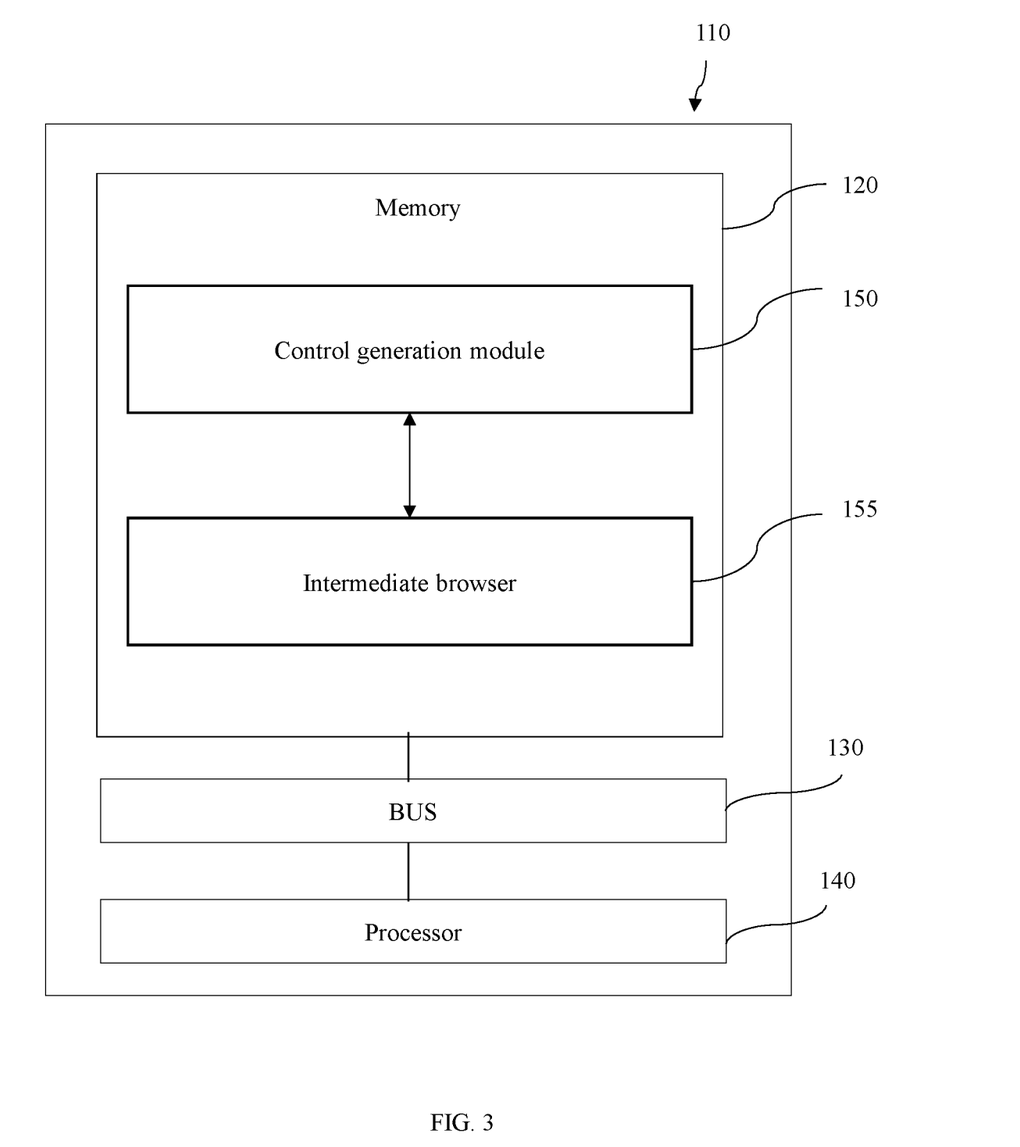
FIG. 3 is a block diagram of a computer or a server in accordance with an embodiment of the present disclosure.

For achieving stated security, the application access system 10 includes a control profile generation subsystem 150 operable by one or more processors along with the intermediate browser 160 (as shown in FIG. 3). The intermediate browser 30 may be hosted in a remote environment or an on-premise environment. In one embodiment, the stated environment may include vendor's cloud, the customer's own cloud, customer's own data centre and the like.

The control profile generation subsystem 150 is configured to identify one or more controllable objects associated with one or more webpages 50 of the target application 40. For identification of the one or more controllable objects, the application access system 10 crawls though the one or more webpages 50. In such embodiment, the one or more controllable objects comprises hyperlinks of any other related webpage, buttons, text boxes, and the like.

The control profile generation subsystem 150 is also configured to create one or more webpage control profiles for the one or more webpages 50 based on one or more inputs received from an administrator for identified one or more controllable objects with respect to one or more users with predefined levels of authorization. In such embodiment, the pre-defined levels of authorization include pre-stored authorization level assigned to a user.

In one embodiment, the one or more inputs received from the administrator with respect to the identified one or more controllable objects includes complete permission, limited access, and denial regarding one or more actions associated with the identified one or more controllable objects. It is pertinent to note that the administrator here refers to the person responsible for carrying out the monitoring activity corresponding to the application access system 10. The stated one or ore actions includes disabling of the controllable objects, greying of the controllable objects and the like.

The control profile generation subsystem 150 is also configured to aggregate the one or more webpage control profiles of all the webpages to generate a control profile of the target application 40. Thereafter, the control profile of the target application 40 and the predefined levels of authorization are mapped and stored. Here, any user with specific level of authorization may only access the objects as allowed by the corresponding control profile. The control profiles may be classified as per different users, user-groups, locations of the users, or some other context of the access.

In an embodiment, the intermediate browser 30 is configured to act as client of application connections to the target application 40 based on input received from the one or more users via the local browser 20. In one embodiment, the user, after login by providing authorization credentials, may provide the input comprises the target application 40 details that the user wants to access.

The intermediate browser 30 is also configured to enable access of the one or more users to the target application 40 based on the security policy of the one or more users with respect to the control profile of the target application 40. In one specific embodiment, the one or more users access the target application 40 based on the security policy with added controls with respect to generated control profile. In such embodiment, added controls includes, but not limited to, data masking on sensitive information, disabling specific actions available in a web page, and preventing clicking certain unauthorized links/buttons by showing warning messages.

The intermediate browser 30 is also configured to send the rendering output of the intermediate browser in form of the one or more presentable attributes to the local browser 20. The one or more presentable attributes include the pixelated images, the graphic vector, the ASCII characters, or transformed HTML contents. In such an embodiment, the intermediate browser 30 converts the output of visual interaction with the target application 40 as the pixelated images, subsequently the local browser 20 displays the output in the form of pixelated images to the user.

In one specific embodiment, the intermediate browser 20 enables access to the targeted application 40 via Secure Shell (SSH) or Remote Desktop Protocol (RDP) software.

The intermediate browser 30 is being further configured to monitor real time interaction of the user with the target application 40. Here, the intermediate browser 30, monitors in real time the interaction of the user with any of the target application 40. The monitoring comprises recording one or more sessions of real time interaction of the user with the target application and analysing recorded real time interaction of the user with the target application.

In one exemplary embodiment, the intermediate browser 30 may enable the administrator to check the number of times the user has visited any particular enterprise web page of the target application 40. In such embodiment, any unauthorized upload or unauthorized download may be flagged through notification. In one specific embodiment, the intermediate browser 30 may enable the administrator to prohibit access to a content based on geo-location of the user or time of the day. Alternatively, the intermediate browser 30 automatically modifies the control profile of the target application 40 based on geo-location of the user or time of the day in order to prohibit access to the controllable objects.

The application access system 10 further comprises a notification subsystem, operable by the one or more processors. The notification subsystem is configured to render real time notification to the one or more users regarding access to the target application 40 based on the control profile of the target application 40 and the predefined authorization level of the one or more users.

Here, real time notification may be in the form of a screen popup, sound alert, voice assistance, e-mail, and SMS. The screen popup notification includes alerting the user by displaying information via a pop-up notification. The sound alert notification includes alerting the user by specific alert tone. Further, the voice assistance notification includes alerting the user via specific voice sound.

For example, if a user may be attempting to forward or send an electronic mail with social security number to his personal email ID via the google mail application, the system 10 will alert denial notification associated with electronic forwarding action. For forwarding the denial notification, the system would check the predefined authorization level of the user along with generated control profile.

Figure 2:
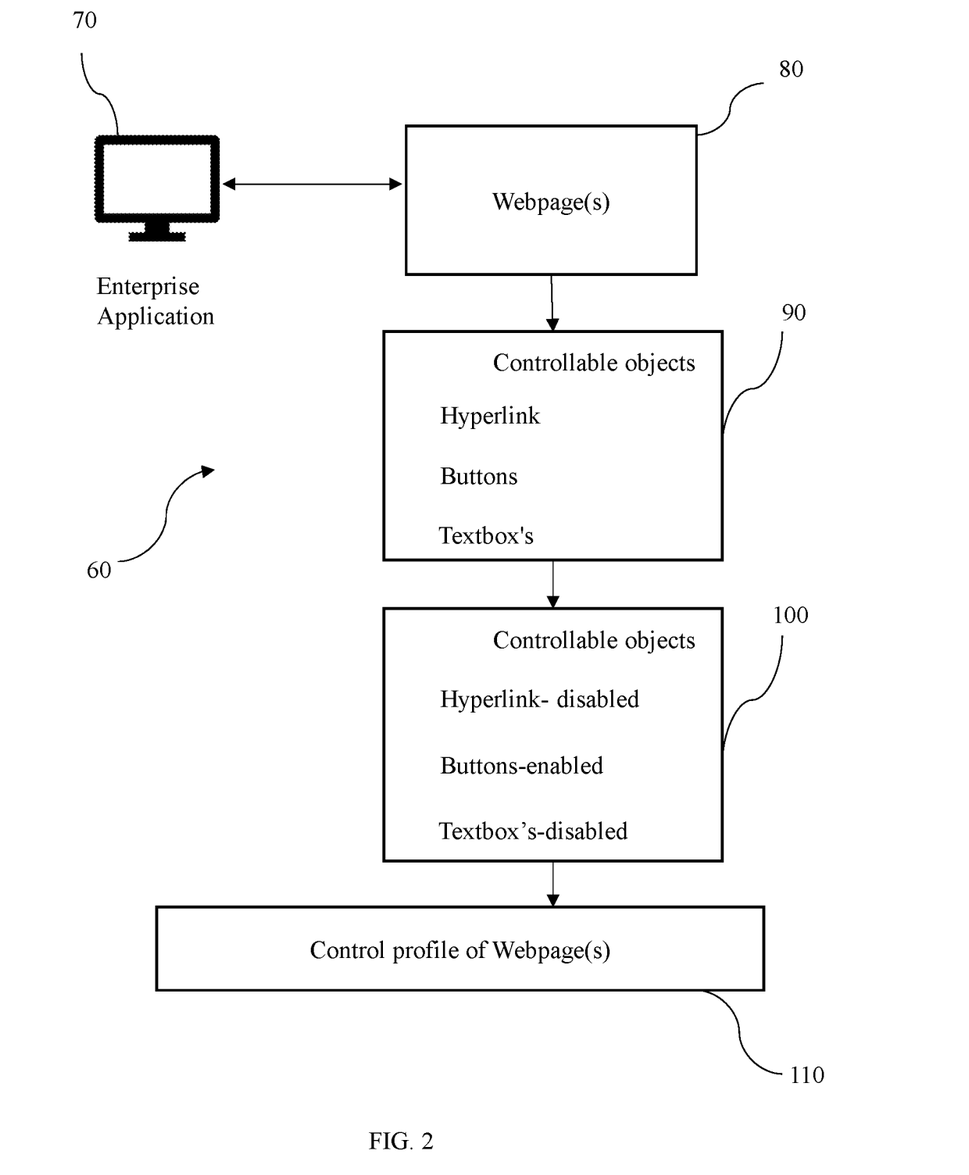
FIG. 2 is a block diagram representation of a workflow for creating controllable objects corresponding to a webpage in accordance with an embodiment of the present disclosure.

FIG. 2 is a block diagram representation of a workflow 60 for identifying the controllable objects corresponding to a webpage 80 in accordance with an embodiment of the present disclosure. For each target application 70 (i.e., enterprise application), the present application access system 10 is configured to automatically crawl through the web pages 80 associated with the target application 70. For each web page 80, the application access system 10 would scan the contents of the web page 80 and generate a list of objects 90 that may be controlled by the administrator.

The objects 90 of the web page may include, but not limited to, hyperlinks, buttons, textbox, allow-upload, allow-download and allow-printing. Here, the administrator reviews the controllable objects 90 and define a webpage control profile for the web page 110, listing the objects that would be disabled or enabled as per requirements of access management. The webpage control profiles of multiple web pages are aggregated to create the one or more control profiles of the application 110.

In such embodiment, for different users or groups, administrators could assign different control profiles 100 based on the users' authorization or connection contexts. This imparts a great deal of access control of users to the target application 70. For example, the administrator may disable the hyperlink, disable the text boxes in the web page, enable download, disable upload and the like.

In one exemplary embodiment, a user X logs in with his credential in the local browser 20, which in turn leads the user X to the intermediate browser 30. The application access system 10 analyses the authorization level of the user X. Here, the application access system 10 detects the senior manager level authorization for the user X. Moving forward, the user X selects office ERP service application in the intermediate browser 30. The application access system 10 gives access to a particular control profile of the ERP service based on the detected level of credential. The user X may access all the webpages that are made available on this particular control profile mapped with the senior manager level authorization. For example, the user X may download the data that is available for manager level authorized personnel.

In one scenario, the administer may limit access to documents for different authorized level personnel by disabling the download button on the control profile of the ERP service application.

The administrator of the control profile may in real time monitor the user X actions on the ERP service application. In another scenario, the administrator may limit the downloading facility of a sales document based on the geographic location of the user X. Here, the user X might be senior manager of the company in different country and may be unauthorized to download the sales document of another country. The application access system 10 provides a popup notification stating, "Content outside jurisdiction".

In another exemplary embodiment, a user Y working in company Z, logs in with his credential in the local browser 20, which leads the user Y to the intermediate browser 30. The application access system 10 of the company Z analyses the credentials of the user Y and provides access to a particular control profile as generated by the company Z administrator.

In the stated exemplary embodiment, if the user Y selects "YouTube application", the administrator may monitor and record the videos searched by the user Y on the application. Here, if the user Y attempts to view videos not related to working domain of company Z, the administrator may provide sound alerts regarding the unauthorized content.

In the above stated exemplary embodiment, the company Z administrator may also disable the "YouTube application" search video button in accordance with time of the day. Here, during normal working hours the company Z might not allow YouTube video browsing.

FIG. 3 is a block diagram of a computer or a server 110 in accordance with an embodiment of the present disclosure. The server 110 includes processor(s) 140, and memory 120 coupled to the processor(s) 140.

The processor(s) 140, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 120 includes a plurality of subsystems stored in the form of executable program which instructs the processor 140 via a bus 130 to perform the method steps illustrated in FIG. 1. The memory 120 has a control profile generation subsystem 150.

The control profile generation subsystem 150 is configured to identify one or more controllable objects associated with one or more webpages of a target application. The control profile generation subsystem 150 is also configured to create one or more webpage control profiles for the one or more webpages based on one or more inputs received from an administrator for identified one or more controllable objects with respect to one or more users with predefined levels of authorization. The control profile generation subsystem 150 is also configured to aggregate the one or more webpage control profiles of all webpages pages to generate a control profile of the target application.

An intermediate browser 155 communicatively coupled with a local browser, is hosted on the server. The intermediate browser 155 is configured to act as client of application connections to the target application based on input received from the one or more users via the local browser. The intermediate browser 155 is also configured to enable access of the one or more users to the target application based on the predefined levels of authorization of the one or more users with respect to the control profile of the target application. The intermediate browser 155 is also configured to render output of the intermediate browser in form of one or more presentable attributes.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. Executable program stored on any of the above-mentioned storage media may be executable by the processor(s) 140.

Figure 4:
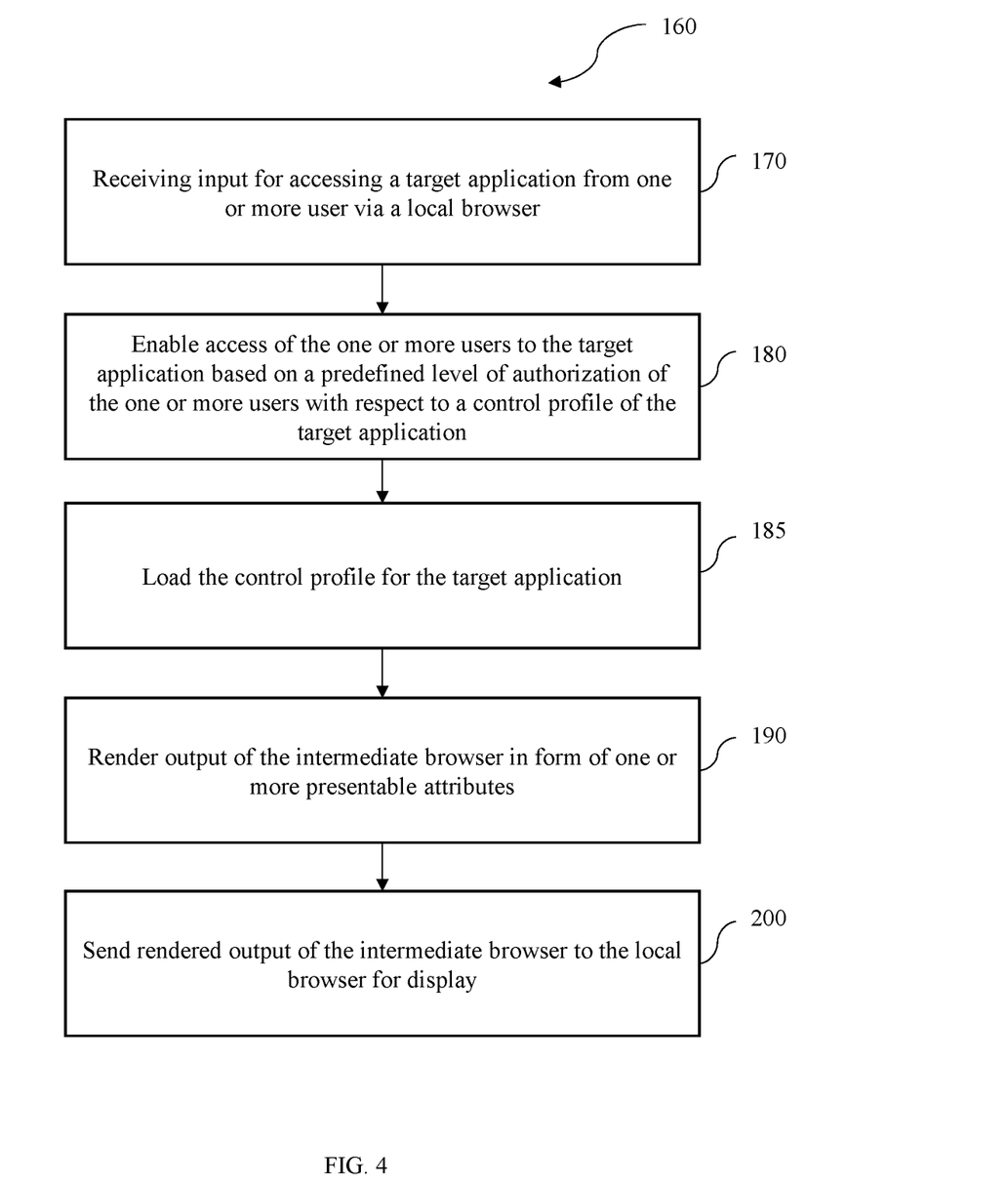
FIG. 4 is a flowchart representing the steps of a method to control application access in accordance with an embodiment of the present disclosure.

FIG. 4 is a flowchart representing the steps of a method 160 to control application access in accordance with an embodiment of the present disclosure. The method 160 includes receiving input, by an intermediate browser, for accessing a target application from one or more user via a local browser in step 170. In one embodiment, receiving input for accessing the target application from the one or more user includes details regarding the targeted application.

In such embodiment, the intermediate browser is being configured to act as client of application connections to the target application based on input received from the one or more users. More importantly, the intermediate browser communicates to the local browser via a predefined communication protocol. In such embodiment, the predefined communication protocol comprises HTTP and HTTPS.

The method also includes loading the control profile for the target application in step 185. In an embodiment, loading the control profile for the target application with added controls includes controls such as data masking of sensitive information, and preventing clicking certain unauthorized links/buttons by showing warning messages and like.

The method 160 also comprises enabling access of the one or more users to the target application based on a predefined level of authorization of the one or more users with respect to a control profile of the target application in step 180. In one embodiment, enabling access of the one or more users to the target application based on the predefined level of authorization of the one or more users includes enabling access of the one or more users by a control profile generation subsystem. In such embodiment, the control profile is being generated and stored by the control profile generation subsystem.

In one specific embodiment, the enabling access comprises identifying the predefined authorization level assigned to the one or more users. In such specific embodiment, the enabling access also comprises modifying the predefined level of authorization of the one or more users based on a geo-location of the one or more users and time of the day of accessing the target application.

The method 160 also includes rendering output of the intermediate browser in form of the one or more presentable attributes in step 190. The method 160 also includes sending rendered output of the intermediate browser to the local browser for display in step 200.

The method 160 also includes monitoring a real time interaction of the user with the target application. In one embodiment, monitoring the real time interaction of the user with the target application includes monitoring the real time interaction of the user with the target application by the intermediate browser. In one embodiment, monitoring the real time interaction of the user with the target application includes monitoring by recording one or more sessions of real time interaction of the user with the target application and analysing recorded real time interaction of the user with the target application.

The method 160 also includes notifying real time notification to the one or more users regarding access to the target application based on the control profile of the targeted application and the predesigned authorization level of the one or more users. In one embodiment, notifying real time notification to the one or more users includes notifying by a notification subsystem.

The method 160 also includes notifying real time notification to the one or more users regarding access to the target application includes notifying by at least one of screen popup, sound alert, voice assistance, e-mail, and SMS.

Figure 5:
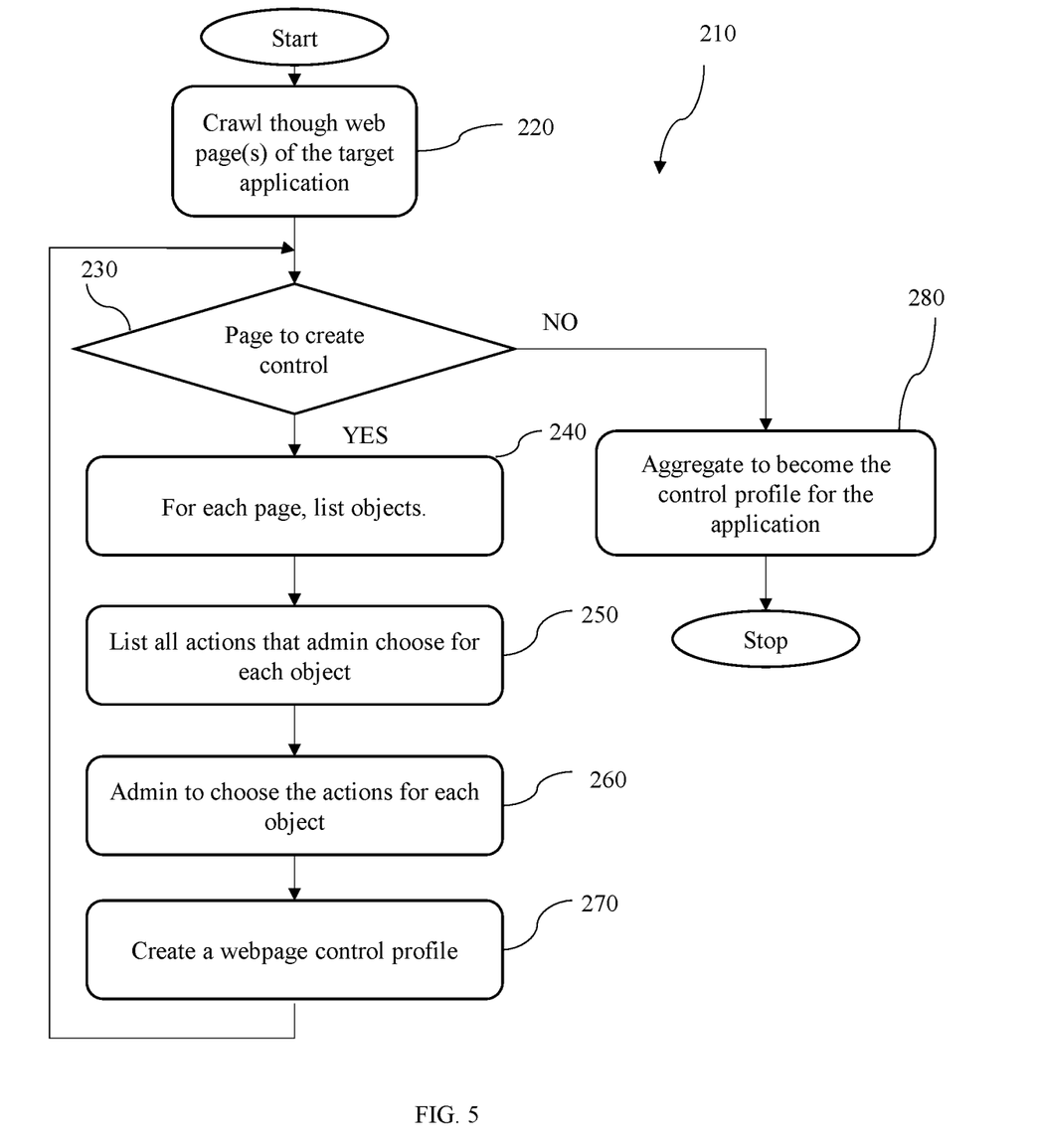
FIG. 5 is a flowchart representing the steps for generating the control profile for each of the web pages in a target web application in accordance with an embodiment of the present disclosure.

FIG. 5 is a flowchart representing the steps 210 for generating the control profile for each of the web pages in a target web application in accordance with an embodiment of the present disclosure. At first instance, the control profile generation subsystem 150, crawls through the webpage of the target application 40 at step 220 to identify one or more controllable objects associated with the webpage of the target application 40. The administrator decides whether control profile is required for the webpage at step 230.

For control access, the control profile generation subsystem 150 lists all controllable objects in the webpage at step 240. The administrator may provide input about respective access objects of the webpage, inputs comprise details about which objects need to be controlled and which not to be.

The administrator may define and list actions for each of the objects to be controlled at step 250. In such an embodiment, at first, the administrator has to decide whether to give complete permission, limited access or denial regarding the listed controllable objects. The administrator after the above decision will determine the actions corresponding to the listed controllable objects at step 260. The actions may be enabling, disabling, greying, blocking and the like.

After all the above stated steps, the control profile generation subsystem 150 creates one or more webpage control profiles for the one or more webpages based on one or more inputs received from an administrator for identified one or more controllable objects at step 270. Lastly, the one or more control profiles of all webpages are aggregated to generate a control profile of the target application 40 at step 280.

Figure 6:
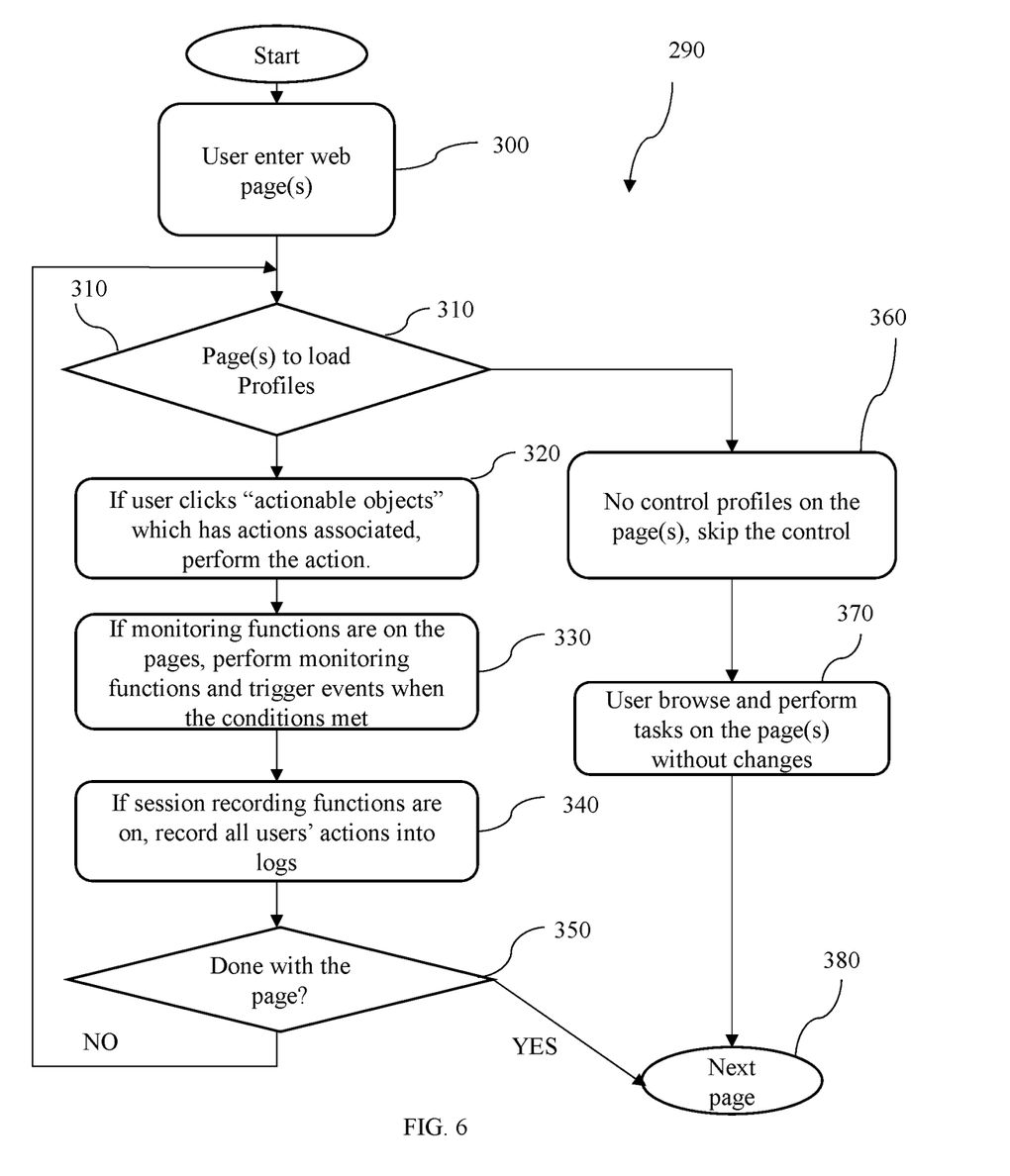
FIG. 6 is a flowchart showcasing working of the control profile when users access web pages in accordance with an embodiment of the present disclosure.

FIG. 6 is a flowchart representing working of the control profile when users access web pages in accordance with an embodiment of the present disclosure. First, a user logins a web page at step 300. After login, according to predefined level of authorization of the user, the system 10 loads the control profile specific to the user and enables access to the web page based on the control profile at step 310. Thereafter, the objects associated with the accessed web page are configured with allowable "actions" in accordance with the control profile. The objects of the web page include stated web page buttons, text boxes, and the like. The corresponding actions include disabling of the object, greying of the object and the like.

If the user clicks on any of the allowable objects associated with the accessed web page, then the system 10 performs an action associated with allowable object at step 320.

The system 10 triggers monitoring of activities of the user regarding accessing the web page, if monitoring functions are provided for the pages and it meets condition provided for triggering the monitoring in the control profile of the user, at step 330. Upon activation of the monitoring, the system 10 monitors each task performed on the accessed web page and trigger further associated events related with the objects of the web page.

Additionally, if session recording functions are on, then the system 10 records actions of all users in multiples sessions logs at step 340. Such recording events helps the system 10 to capture the activity of the users during a particular as well as overall sessions and further understand the behavioural pattern of the users.

Lastly, the user at step 350 may decide to move to a different web page of the target application. Subsequently, the user lands at the next webpage at step 380. It is pertinent to not that the user may also decide to reload the same control profile web page and re-access the web page.

Alternatively, after login, the system 10 may provide full access to the user to a web page which does not have the control profile at step 360. Here, the objects associated with the accessed web page will not be configured with any "actions". The user may easily browse and perform tasks on the web page as stated at step 370.

Present disclosure solves a key issue of data leakage through enterprise application access. Here, the present invention provides an effective method to control what users may do on each individual webpage, without installing any software on user's computer. Further, any enterprise administrator may simultaneously monitor user interaction in any application, thereby the system provides extra security.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A computer-implemented system to control application access, comprising:
processors and a memory, and wherein the memory comprises a set of program instructions in the form of a plurality of subsystems, configured to be executed by the processors, wherein the plurality of subsystems comprises:
a control profile generation subsystem executed by at least one of the processors to:
identify one or more controllable objects associated with one or more webpages of a target application;
create one or more new webpage control profiles for the one or more webpages based on one or more inputs received from an administrator for identifying the one or more controllable objects with respect to one or more users with predefined levels of authorization, wherein the predefined levels of authorization correspond to prestored authorization levels assigned to the one or more users; and aggregate the one or more new webpage control profiles of all webpages to generate a control profile of the target application;
load the generated control profile for the target application; and
an intermediate browser, hosted on a server, communicatively coupled with a local browser, and configured to:
act as client of application connections to the target application based on input received from the one or more users via the local browser;
enables access of the one or more users to the target application based on identifying the predefined levels of authorization of the one or more users with respect to the control profile of the target application, wherein the enabling access comprises modifying the predefined levels of authorization of the one or more users based on a geo-location of the one or more users and time of day of accessing the target application; and
send rendered output of the intermediate browser to the local browser in form of one or more presentable attributes, wherein the one or more presentable attributes include at least one of pixelated images, graphic vectors, ASCII characters, and transformed HTML contents.

2. The computer-implemented system of the claim 1, wherein the input received from the administrator with respect to the identified one or more controllable objects comprises one of complete permission, limited access, and denial regarding one or more actions associated with the identified one or more controllable objects.

3. The computer-implemented system of the claim 1, wherein the intermediate browser is hosted in one of a remote environment and an on-premise environment.

4. The computer-implemented system of the claim 1, wherein the intermediate browser is connected via a predefined communication protocol with the local browser.

5. The computer-implemented system of claim 4, wherein the predefined communication protocol comprises HTTP and HTTPS.

6. The computer-implemented system of the claim 1, wherein the rendered output of the intermediate browser is sent to the local browser for display.

7. The computer-implemented system of the claim 1, wherein the intermediate browser is further configured to monitor real time interaction of the one or more users with the target application.

8. The computer-implemented system of the claim 1, further comprises a notification subsystem executed by at least one of the processors to render real time notification to the one or more users regarding access to the target application based on the control profile of the target application and the predefined levels of authorization of the one or more users.

9. A computer-implemented method to control application access, comprising:
receiving input, by an intermediate browser, for accessing a target application from one or more users via a local browser, wherein the intermediate browser being configured to act as client of application connections to the target application is based on input received from the one or more users, and the intermediate browser communicates to the local browser via a predefined communication protocol;
enabling access, by a control profile generation subsystem, of the one or more users to the target application based on identifying predefined levels of authorization of the one or more users with respect to a control profile of the target application, wherein the control profile is generated and stored by the control profile generation subsystem, wherein the predefined levels of authorization correspond to prestored authorization levels assigned to the one or more users, and wherein the enabling access comprises modifying the predefined levels of authorization of the one or more users based on a geo-location of the one or more users and time of day of accessing the target application;
identify one or more controllable objects associated with one or more webpages of the target application;
create one or more new webpage control profiles for the one or more webpages based on one or more inputs received from an administrator for identifying the one or more controllable objects with respect to the one or more users with the predefined levels of authorization;
aggregate the one or more new webpage control profiles of all webpages to generate the control profile of the target application;
loading the control profile for the target application;
rendering output of the intermediate browser in the form of one or more presentable attributes, and wherein the one or more presentable attributes include at least one of pixelated images, graphic vectors, ASCII characters, and transformed HTML contents; and
sending the rendered output of the intermediate browser to the local browser for display.

10. The computer-implemented method of claim 9, wherein the enabling access comprises identifying the predefined levels of authorization assigned to the one or more users.

11. The computer-implemented method of claim 9, wherein generation of the control profile of the target application by the profile control profile generation subsystem comprises:
identifying one or more controllable objects associated with one or more webpages of the target application;
creating one or more webpage control profiles for the one or more webpages based on one or more inputs received from an administrator for identified one or more controllable objects with respect to one or more users having the predefined levels of authorization; and
aggregating the one or more control profiles of all webpages to generate a control profile of the target application.

12. The computer-implemented method of claim 11, wherein the one or more inputs received from the administrator comprises one of complete permission, limited access, and denial regarding one or more actions associated with the identified one or more controllable objects.

13. The computer-implemented method of claim 9, wherein the predefined communication protocol used for communication between the intermediate browser and the local browser comprises Hypertext Transfer Protocol (HTTP) and Hypertext Transfer Protocol Secure (HTTPS).

14. The computer-implemented method of claim 9, further comprises monitoring, by the intermediate browser, a real time interaction of the one or more users with the target application.

15. The computer-implemented method of claim 14, wherein the monitoring comprises recording one or more sessions of real time interaction of the one or more users with the target application and analysing recorded real time interaction of the one or more users with the target application.

16. The computer-implemented method of claim 14, wherein the real time interaction of the one or more users comprises using one or more actions associated with the identified one or more controllable objects.

17. The computer-implemented method of claim 9, further comprises notifying, by a notification subsystem, real time notification to the one or more users regarding access to the target application based on the control profile of the target application and the predefined levels of authorization of the one or more users.

18. The computer-implemented method of claim 17, wherein the real time notification comprises at least one of screen popup, sound alert, voice assistance, e-mail, and Short Message Service (SMS).

\* \* \* \* \*